Figure 1:
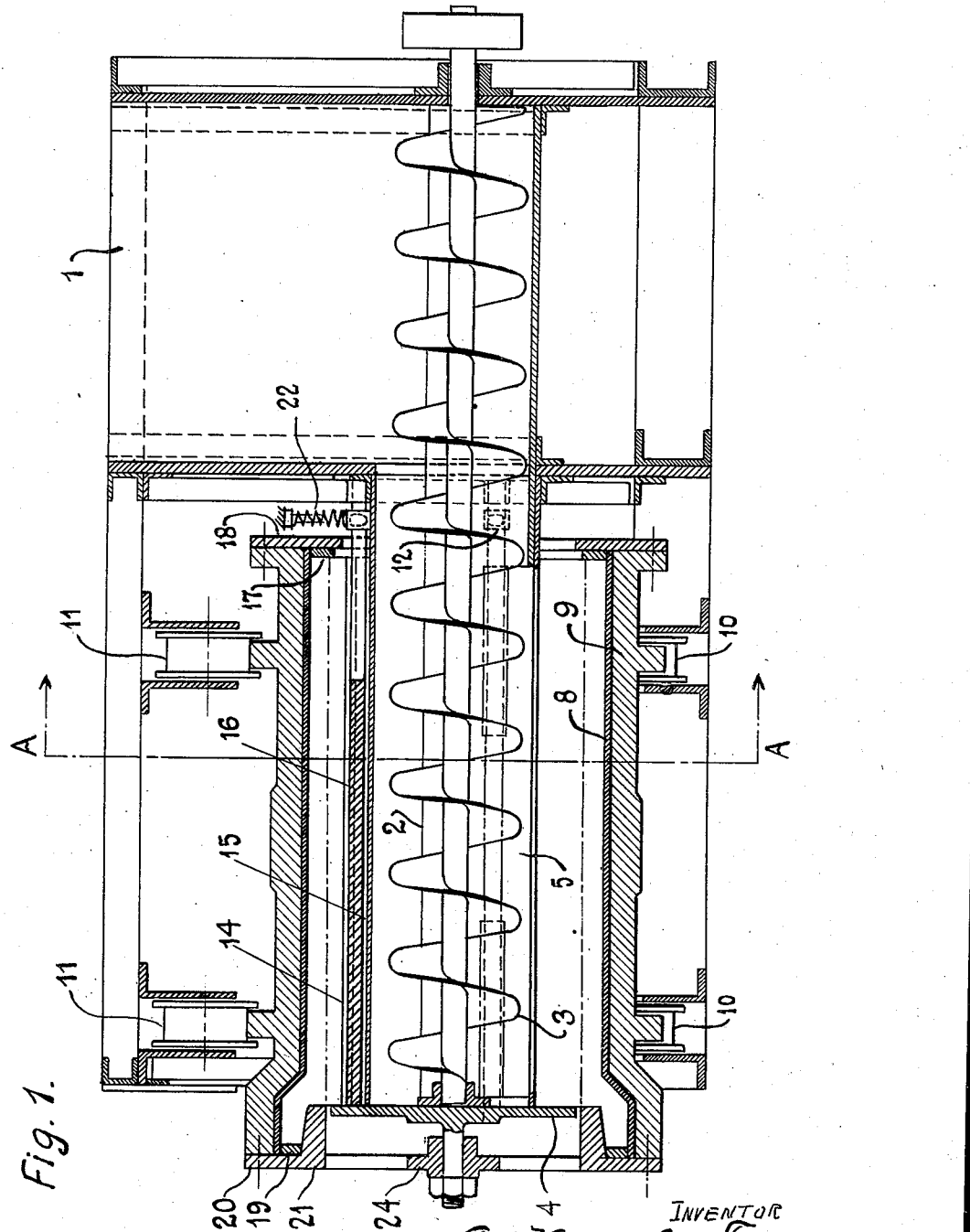

June 20, 1939.  E. V. C:SON FEJMERT  2,163,118
APPARATUS FOR MAKING HOLLOW BODIES OF PLASTIC MATERIAL
Filed Sept. 28, 1935  2 Sheets-Sheet 1

INVENTOR
Erik Valdemar C:son Fejmert
by Joseph F. O'Brien
Attorney

June 20, 1939.                E. V. C:SON FEJMERT                2,163,118
           APPARATUS FOR MAKING HOLLOW BODIES OF PLASTIC MATERIAL
                     Filed Sept. 28, 1935        2 Sheets-Sheet 2
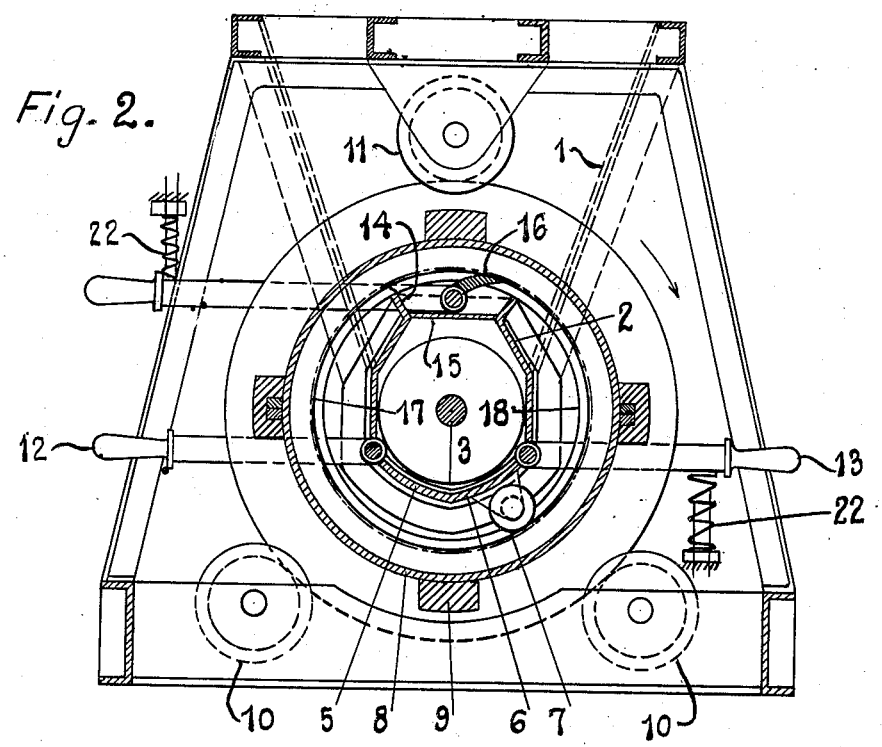
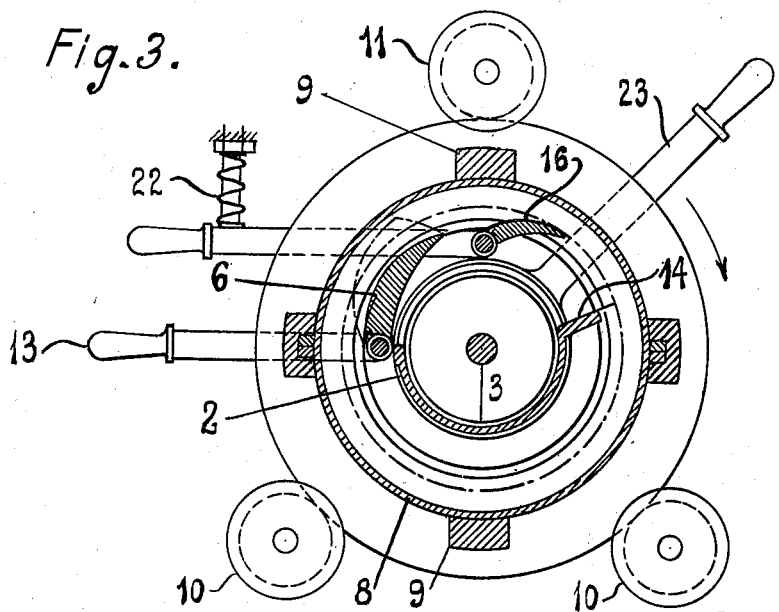

Patented June 20, 1939

2,163,118

UNITED STATES PATENT OFFICE 2,163,118

APPARATUS FOR MAKING HOLLOW BODIES OF PLASTIC MATERIAL

Erik Valdemar C:son Fejmert, Nykoping, Sweden

Application September 28, 1935, Serial No. 42,584
In Sweden December 14, 1933

2 Claims.  (Cl. 25—30)

This invention relates to means or apparatus for the manufacture of hollow articles of plastic material such as concrete pipes, poles or the like, in a rotatable mold, by employing the centrifugal action at slow or high speed of the mold, eventually in conjunction with the appliance of a mechanical pressure or rolling of the material.

The employment of centrifugal action in the production of hollow bodies of concrete has already been proposed in several inventions, but in these cases the machinery has been complicated and the manufacture time-wasting and expensive. The feeding of the material has, for example, usually been effected by means of a longitudinal feeding tube that has been filled with material outside the mold, then moved into the mold in an axial direction and discharged by turning upside down. Usually, these movements must be repeated several times in order to obtain the right wall-thickness. Except in some cases, where certain kind of mechanical pressure has been applied on local points of the material by means of pressure rollers or wiping devices that have been moved in an axial direction inside the mold after the substance has been applied, the centrifugal action has been the only effective factor used for forming and packing or compressing the substance. A pressure applied in said way, on local points of a plastic substance, has very little effect on the forming, packing or compression of the substance, whereby the centrifugal action at high speed of the mold will tend to separate the different particles of the substance.

The main object of the present invention is to procure a manufacturing machinery of very simple design with fewest possible moving parts for the purpose of reducing price of machinery and cost and time of manufacture.

Another object of this invention is to procure a manufacturing machinery which will evenly apply the material to the inside of the rotating mold in radial layers of any desired shape and simultaneously expose the material to an even pressure or rolling action along a longitudinal generatrix of the article that will compress the substance and eliminate the separation of the different particles at high speed of the mold.

A form of machine, illustrating the present invention, is shown in the accompanying drawings, wherein Fig. 1 is a longitudinal section, Fig. 2 is a cross section at A—A in Fig. 1 and Fig. 3 is a cross section of a modified form of machine as described below. The machine shown in these drawings is intended for the production of socket pipe of concrete. The invention, however, is not limited to such kind of pipes but can comprise the manufacture of all kinds of hollow bodies of concrete, clay or similar plastic material.

The production of a concrete pipe in a machine as shown in the accompanying drawings is effected as follows:

From a concrete mixer, not shown here, concrete is discharged into the magazine 1, from which it is transported into a longitudinal feeding tube 2 by means of a conveying screw 3. The feeding tube 2 is at one end connected to the magazine 1 and at the other end closed by an end plate 4. The conveying screw 3 is at one end supported by a bearing in the outer wall of the magazine 1 and at the other end by a bearing in the end plate 4. In the form of machine shown in Figs. 1 and 2 the feeding tube 2 has a longitudinal opening at the bottom side along the whole part of the mold to be fed. This opening is closed or opened by a hinged cover plate 5. Alongside the feeding tube, at the whole length of the opening in the same, a pressing plate 6 is preferably arranged for the purpose of exerting pressure on the material when it is deposited on the inside of the mold. This pressing plate can be used alone or it may be furnished with a roller 7. The pressing plate and also the roller can be made in several sections and can be given any desired shape as conical, grooved etc. From the feeding tube 2 the concrete is fed, through the opening in the same, to the inside of the rotating mold 8 which is engaged by a rotatable casing 9. During the feeding the material may be rolled in radial layers along the whole length of the feeding by the roller 7. The roller can also be removed and the pressing plate 6 may instead do the pressing of the radial layers. The casing 9 and the mold 8, which surround the whole feeding opening, are preferably supported and rotated on wheels 10 and 11 and may be rotated by a belt around the casing from an electric motor not shown. The size of the feeding opening can be controlled from outside by a lever 12 attached to the hinged cover plate 5. The roller and pressing plate may also be controlled from the outside by a similar lever 13. The amount of material admitted to the inside of the mold as well as the pressure exerted on the same is thus controlled from the outside by these levers. The final thickness of the wall of the object is controlled by an adjustable knife 14, preferably arranged at the top side of the feeding tube 2 in connection with an opening in the same that runs along the whole length of the knife and will permit the superfluous material to be delivered back to the feeding tube. By reversing the rotation of the conveying screw 3 the superfluous material also may be transported back from the feeding tube to the magazine 1. The opening at the top of the feeding tube may be covered by a cover plate 15, during the feeding operation, which can be pulled out lengthwise when desired. When the right thickness of the wall of the object has been reached the mold is rotated with high speed in order to further compress the material, after which the inside of the wall is finally finished by a smoothing blade 16 which can be controlled from the outside by a lever. When the final finish is completed the mold 8 is pulled out from the casing 9 and a new mold can be inserted and the operation, as described above, can be repeated. In order to stop the material from flowing out at the ends of the mold a transverse plate ring is fitted at each end. The inner end of the mold is thus furnished with an end ring 17 which is resting against a face plate 18 fitted to the casing 9. At the socket end of the mold a similar end ring 19 is resting against a face plate 20, which is fitted to the casing 9 with bolts or the like and serves as a cover of the end of the casing which is removed when the mold is ready to be taken out from the casing. The end rings 17 and 19 may also serve to protect the ends of the pipe during the curing time. The face plate 20 and eventually the end rings can be arranged with end formers of any desirable shape. In this machine the face plate 20 has a ring former 21 for forming the end of a socket pipe. The face plate 20 may also be furinshed with a bearing 24 for the outer end of the feeding tube, preferably for a shaft fitted in the end plate 4. The levers 12 and 13 and also the lever for the smoothing blade 16 may either be regulated by hand or these levers may be furnished with springs 22 which are adjusted to the desired pressure.

Several modifications in the construction of the feeding and pressing appliances can be found within the limits of the invention. A special form of modification is shown in Fig. 3, where the feeding tube has no opening at the bottom side but has at the top side a longitudinal opening evenly divided in sections. In this case the feeding tube is mounted in a bearing, fitted in the wall of the magazine 1, whereby it may be radially turned so that the opening points downwards when the tube is being discharged. The turning may be effected by means of a lever 23. In this case the pressing plate 6 is arranged alongside the feeding tube at the whole length of the feeding opening in the same and is preferably mounted on a shaft that can be turned in a bearing fitted in the wall of the magazine 1. The handling of the pressing and smoothing blades respectively 6 and 16 may be effected by levers as mentioned above. The superfluous material may be removed and delivered back to the feeding tube by means of the knife 14 fitted alongside the opening in the feeding tube. The conveying screw 3 may be omitted and a pump or the like substituted for transporting the material from the magazine into the feeding tube.

The absence of all axial movements of the feeding and pressing appliances, as described above, will simplify the construction of the machinery as well as the process of manufacture. The herein described machinery may also be mounted on wheels and transported to any desired place, for example along a pipe line to be laid. The pressing and rolling action on the material, as described above, will give an even spreading and packing of the material, when it is deposited on the inside of the mold, also an initial compression that will completely eliminate any separation of the different particles during the centrifugal action at high speed of the mold.

Having thus described my invention I claim:

1. A machine for making hollow bodies of plastic material comprising, in combination, a horizontally disposed rotatable casing, a horizontally disposed mold within the casing and rotatable therewith, a stationary magazine adjacent one end of the casing, a stationary feed tube having a longitudinal slot therein disposed within the mold and having one end in communication with the magazine and the other end closed, a bearing on the casing in axial alignment with the mold for supporting the closed end of the tube, means for conveying material from the magazine into the tube and for forcing it out through the slot therein into the mold and means for securing the mold, casing, feed tube and magazine against relative longitudinal movement.

2. A machine for making hollow bodies of plastic material comprising, in combination, a horizontally disposed rotatable casing, a horizontally disposed mold within the casing and rotatable therewith, a stationary magazine adjacent one end of the casing, a stationary feed tube having a longitudinal slot therein disposed within the mold and having one end in communication with the magazine and the other end closed, a bearing on the casing in axial alignment with the mold for supporting the closed end of the tube, means for conveying material from the magazine into the tube and for forcing it out through the slot therein into the mold, means for exerting pressure on said material in the mold consisting of one or several longitudinal pressing plates arranged alongside the opening in the feed tube and means for securing the mold, casing, feed tube, magazine and pressing plates against longitudinal movement.

ERIK VALDEMAR Cson FEJMERT.